Jan. 15, 1929.
M. S. GAZELLE
ELECTRIC WATER HEATER
Filed Feb. 3, 1926
1,698,992
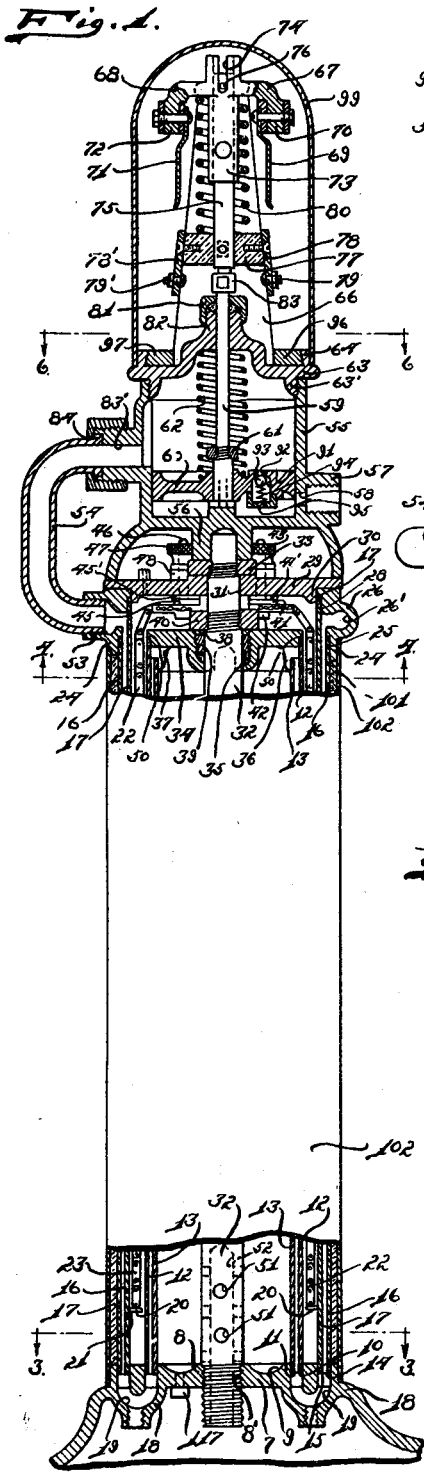
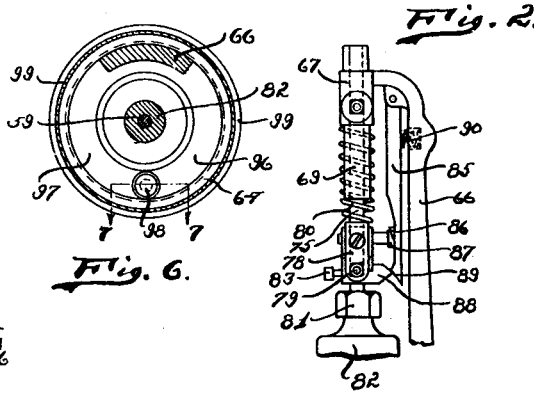
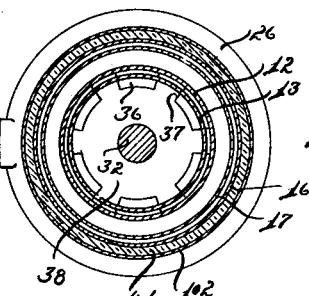
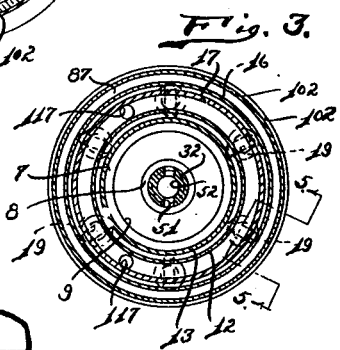
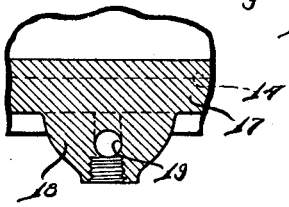
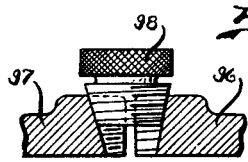
INVENTOR.
Michel S. Gazelle.
BY Thos L Donnelly
ATTORNEY.

Patented Jan. 15, 1929.

1,698,992

UNITED STATES PATENT OFFICE.

MICHEL S. GAZELLE, OF DETROIT, MICHIGAN.

ELECTRIC WATER HEATER.

Application filed February 3, 1926. Serial No. 85,794.

My invention relates to a new and useful improvement in an electric heater for use in heating liquids of various kinds and particularly for heating water which is under pressure so that the invention may be used as an instantaneous heater for heating the water as it passes through the heater. An object of the present invention is the provision of a heater of this class which will be simple in structure, economical of manufacture and highly efficient in use, while at the same time the heater will be durable and compact.

Another object of the invention is the provision of a number of tubular members so arranged and constructed and assembled that the maximum amount of heating may be had while the device is easily and quickly assembled.

Another object of the present invention is the provision of a switch which will be automatically operated and which will be quick and positive in its action; assuring a quick make and break so as to prevent arcing.

Other objects will appear hereinafter.

The invention consists in the combination and arrangement of parts hereinafter described and claimed.

The invention will be best understood from a reference to the accompanying drawings which form a part of this specification and in which, Fig. 1 is a central vertical sectional view taken on substantially line 1—1 of Fig. 3.

Fig. 2 is a fragmentary side elevational view of the upper end of the switch mechanism.

Fig. 3 is a sectional view taken on substantially line 3—3 of Fig. 1.

Fig. 4 is a sectional view taken on substantially line 4—4 of Fig. 1.

Fig. 5 is a fragmentary sectional view taken on substantially line 5—5 of Fig. 3.

Fig. 6 is a section on the line 6—6 of Fig. 1.

Fig. 7 is a detail in section of part of the switch frame.

The invention comprises a base 7 which is circular in form and preferably made from metal. A circular groove 9 is formed concentric of the axis of the base 7 to provide the centrally positioned boss 8 having a threaded opening 8′ formed therein.

Formed in the base 7 are concentric grooves 10 and 11 spaced slightly apart, and the grooves 14 and 15 also spaced slightly apart, the two pairs being spaced from each other a greater distance than the grooves in each pair. Engaging in the groove 10 is one end of a tube 12, preferably made from metal. Engaging in the groove 11 is the corresponding end of a tube 13, also preferably made from metal, it being desirable that the tubes used in the invention be made from some efficient heat conducting material. Engaging in the groove 14 is the lower end of a tube 16 and engaging in the groove 15 is the lower end of a tube 17, these tubes being spaced apart. Projecting from the base 7, are bosses 18 each of which is provided with a passage 19 which serves to communicate the space between the tubes 16 and 17 with the space between the tubes 12 and 13. Mounted on the inner surface of the tube 17, by suitable supporting rivets 21 is a bracket 20 which serves to support insulators 22, of a well known type, through which is projected the heating element 23. The structure of the insulators and the method of projecting the heating element therethrough is of a well known type and since the same forms no part, by itself, of this invention a detailed description is not given of them.

An upper ring 24, preferably cast from suitable metal is provided with a cut away portion 25 to provide a shoulder against which engages the upper end of the tube 16 which is of such size as to fit snugly within the ring 24, the fit being a press fit. Extending around the ring 24 is a bead 26 having the passage 26′ formed therein, which communicates through the passage 27 with the space between the tubes 16 and 17, the ring 24 having the cut-away portion 28 for the reception in a press fit of the upper end of the tube 17.

A cap 29 is provided which fits over the ring 24 and has the inwardly projecting flange 30 which engages the inner surface of the tube 17. The cap 29 is provided with the central opening 31 through which is projected the shaft 32, the lower end of said shaft being threaded into the opening 8′ of the base 7. Threaded on the upper end of the shaft 32 so as to retain the cap in position thereon is a nut 33. A cap 34 is provided for the upper end of the tubes 12 and 13. A face flange 36 is formed on the cap 34 and provided with a cut-away portion 50 for the reception of the upper end of the tube 12 and a cut-away portion 49 for the reception of the upper end of the tube 13, the fit of these tubes on this cap and flange being a press fit. A stuffing box 38 projects inwardly from the center of the cap 34, a gland 39 serving to compress the stuffing or packing 35, to form a water tight connection around the shaft 32. A nut 40 is also threaded on the shaft 32 to retain the cap 34 in position thereon, this nut 40 being of insulating material or if not, properly insulated from the heating element which is angularly turned and brought to the center of the cap for connection with the terminals illustrated. Insulating washers 41 and 41' which are mounted on the terminal stud 42 serve to insulate the heating element from the cap 29. The terminal nut 43 which is threaded on the stud 42 is insulated from the cap 29 by the insulating washer 44. Washers 43 and 45' serve to insulate the heating element from the cap 29, these washers being mounted on the terminal stud 46. The terminal nut 47 is insulated from the cap 29 by means of the washer 48. These terminal studs are each connected to the heating element and free from contact with the cap 29 through which they are projected. By connecting the terminal studs 42 and 46 to the switch provided means is afforded for operating the heating element.

The shaft 32 is formed tubular at its lower end with the passage 52 communicating through a plurality of openings 51 with the interior of the tube 13, so that the water therein may flow through the passage 52 to the exterior of the device. The lower end of the shaft 32 is threaded so that a suitable conduit may be attached thereto for conducting the water to any desired position after the same has been heated by the heating element. If desired a spigot may be attached to this threaded end of the shaft 32 and the water drawn off through the spigot.

A nipple 53 is formed on the cap 24 communicating with the space between the tubes 16 and 17, and connected by means of the pipe 54 to the interior of the cylinder 55, which has, projecting outwardly from its base the socket bearing boss 56, in which projects the upper end of the shaft 32. A nipple 57 serves to afford means for connecting the cylinder 55 in communication with a suitable source of water supply, this nipple 57 communicating with the interior of the cylinder 55 through the small opening 58, so that the flow of the water into the cylinder will be retarded by the small opening to flow at a slower rate than would be the case with a larger opening.

A piston rod 59 is attached at one end to a piston 60 which is slidably mounted in the cylinder 55. Threaded on the piston rod 59 is a nut 61, and a spiral spring 62 embraces the rod 59 and engages at one end the piston 60 and at the other end the cover 63 of the cylinder. A face flange 63' is formed on the cover 63 and threaded into the open end of the cylinder 55. Projecting outwardly from the opposite face of the cover 63 is a flange 64, positioned closer to the rim of the cover than is the flange 63', and tapered as shown in Fig. 1. A switch housing 65 which is cup-shaped is mounted on the flange 64. Projecting upwardly from the cover 63 is a supporting standard 66 having cross arms 67 and 68 at its upper end. Secured to the arm 67 by means of the terminal stud 70 is a spring contact arm 69. A similar contact arm 71 is mounted on the terminal stud 72.

Projecting downwardly from the cross arm 67 is a guide sleeve 73, a slot 74 being formed in the upper end of the cross head. Slidably mounted in the guide sleeve 73 is a rod 75 having a pin 76 projected therethrough and engaging in the slot 74 so that the movement of the rod 75 in one direction is limited. Mounted upon the rod 75 is a cross bar 77 made from insulating material and secured to one side thereof is a contact plate 78 having a terminal 79 attached thereto. Mounted on the other side of the cross bar 77 is a contact plate 78' having a terminal stud 79' attached thereto. Positioned about the rod 75 and engaging the cross arms 67 and 68 at one end and the cross bar 77 at the other end is a spiral spring 80. The rod 59 projects through a stuffing box 81 which is threaded on a neck 82 formed on the cover 63. Secured to the piston rod 59 at its upper end is a collar 83 which serves to engage the gland or stuffing box 81 to limit the movement of the piston rod 59 in one direction.

The structure is such that when the water is turned on so as to permit it to flow through the opening 58 the piston 60 will be moved upwardly in the cylinder 55 against the tension of the spring 62. It will be noted that the piston 60 is mounted on the piston rod 59 with a slight play so that it will rise in the cylinder 55 a slight distance before engaging the nut 61, the purpose being that the piston 60 may thus be forced loose from the cylinder 55 before causing a movement of the rod 59. As the rod 59 moves upwardly it forces the rod 75 upwardly so as to bring the contacts 78 and 78' into engagement with the spring contacts 69 and 71 respectively. These contacts 69 and 71 are each connected through the terminals 70 and 72 to a suitable source of electrical energy. The terminals 79 and 79' which are mounted on the contact plates 78 and 78' respectively are connected through the terminals 42 and 46 to the heating element 23 which has been described so that as the piston 60 moves upwardly in the cylinder 55 a sufficient distance the circuit to the heating element is closed, this closing taking place at substantially the same time as when the water is permitted to pass from the cylinder 55 through the pipe 54 into the space between the tubes 12 and 13 and 16 and 17.

As the piston 60 moves upwardly so as to clear the outlet port 83' formed in the nipple 84 to which the pipe 54 is attached the water entering through the opening 58 will pass through the pipe 54 into the space between the tubes 16 and 17 and thence downwardly through the pipes 19 into the space between the tubes 12 and 13. The water will thence pass upwardly between these tubes and outwardly through the openings 37 formed in the flange 36, thus passing to the interior of the tube 13 so that the water may pass through the openings 51 and outwardly through the passage 52 formed in the lower end of the shaft 32. A suitable hose or spigot may be attached to the lower end of the shaft 32 for leading off the water as desired or if the device is interposed in the water supply system of a dwelling or the like the inlet to be attached to the nipple 57 and the distributing pipe to the outlet end of the shaft 32.

It will be noted that the water in passing downwardly and thence upwardly between the tubes is brought into close proximity to the heating element and a maximum heating is effected.

Mounted pivotally at one end on the upper end of the standard 67 is a locking dog 85 having a shoulder 86 formed thereon. Projected rearwardly from the rod 75 is a locking finger 87 adapted upon movement of the cross bar 77 sufficiently upwardly to close the circuit to engage the locking shoulder 86 so as to prevent movement downwardly of the cross bar 77 in response to the tension of the spring 80 upon release of the upward pressure on the rod 59.

Projecting rearwardly from the collar 83 is an actuating finger 88 adapted to engage a shoulder 89 on the locking dog 85. As the rod 59 moves upwardly in response to the movement of the piston 60 this finger 88 moves the locking dog rearwardly on its pivot against the tension of the spring 90. As the finger 88 clears the shoulder 89 the locking dog 50 is permitted to swing on its pivot in response to the pressure of the spring 90 so as to move the shoulder 86 into position for engaging the undersurface of the finger 87.

It will be noted that the finger 88 has both sides beveled and that both sides of the shoulder 89 are inclined or beveled. The arrangement is such that when the rod 59 moves upwardly the circuit is closed as described and the cross bar 79 is locked in position to retain the circuit closed. When the water is turned off and the cylinder 60 moves downwardly in the piston 55 this movement will be a slow movement depending upon conditions. It is desired that the breaking of the circuit be a quick one to prevent arcing and for this reason the locking mechanism just described is provided. The arrangement is such that the piston rod 59 will move downwardly so that the finger 88 will force the dog 85 to swing on its pivot to bring about a disengagement of the shoulder 86 from the finger 87, at which time there will be a substantial distance between the upper end of the rod 59 and the lower end of the rod 75 so that when the disengagement of the shoulder 86 with the finger 87 is brought through the movement of the locking dog 85 by the finger 88 the spring 80 will cause the contact plates 78 and 78' to be quickly disengaged from the spring contacts 69 and 71, thus causing a quick break in the circuit and preventing arcing.

Formed in the piston 60 is a chamber 91 having an opening 92 formed at one side and normally closed by the ball 93 which is held in position by the spring 94. An opening 95 is formed in the opposite end of the chamber 91. This arrangement is one which affords an equalization of the pressure on both sides of the piston 60 and permits an escape of steam from the cylinder 55 should steam be developed in the device.

It is evident that when the piston moves from open position to closed position that some water will flow through the chamber 91 and that water may also flow through the chamber 91 upon movement of the piston 60 to open position.

The standard 66 is provided with an arcuate split base forming the arms 96 and 97 which have their outer surfaces tapered to cooperate with the taper on the flange 64, a screw 98 serving to expand these arms 96 and 97 for effecting their movement into close engagement with the flange 64 for retaining the standard in position. The method of mounting the standard in the cap 63 is a simple and effective one, durable and quite efficient for the purposes intended.

Mounted upon the cap 63 is a cover 99 which serves to cover the switch and its operating mechanism.

Owing to the fact that the tubes 12 and 13 and 16 and 17 sweat and deposit moisture in the space lying between the tubes 12 and 17 in which the heating element is positioned the base 7 may be provided with openings for permitting draining.

Positioned about the tube 16 is a layer 101 of asbestos or other insulating material which is held in position by a suitable cover 102.

While I have illustrated and described the preferred form of structure, I do not wish to limit myself to the precise embodiment of the invention shown, but desire to avail myself of such variations and modifications as come within the scope of the appended claims.

Having thus described my invention what I claim as new and desire to secure by Letters Patent is:

1. In an electric heater of the class described; a base having a plurality of concentric grooves formed therein, said grooves being arranged in pairs in spaced relation, the pairs being spaced farther apart than the grooves in each pair; a plurality of tubes, each engaging at its lower end in one of said grooves, the space between the pairs of grooves communicating through passages formed in said base, and a cover for the upper end of said pairs of tubes.

2. An electric heater of the class described comprising a base having a plurality of concentric grooves formed therein; a plurality of tubular members projecting upwardly from said base, each of said members engaging at its lower end in one of said grooves, the space between said grooves communicating through passages formed in said base; an electric heating element positioned between a pair of said members; a cap mounted on the inner pair of said members, said cap having openings formed therein for communicating the space between said members with the inside of the innermost of said members; a cover for a pair of said members, said cover having a passage formed therein communicating with the space between said members; a cylinder in communication with said passage in said cover; a piston slidably mounted in said cylinder for opening and closing communication between an inlet port and an outlet port formed in said cylinder and means operable upon the establishing of communication between said inlet port and said outlet port for closing the circuit to said heating element.

3. In an electric heating device of the class described, a container; a plurality of concentrically arranged tubes in said container; a base on said container engaging the bottom of said tubes and closing direct communication between the interiors thereof, said base having passages formed therein for establishing communication between the spaces between a plurality of said tubes; a ring engaging the upper end of said tubes; a bead on said ring for establishing communication between the spaces between the outermost of said tubes and an inlet port; a tubular shaft projected through said base, and extending above said ring for communicating said passages between said tubes indirectly with an outlet port.

4. An electric water heater including a plurality of concentric cylinders of such diameters as to form a narrow space between two of them as an outer water passage and a narrow space between two others to form an inner water passage and to form a heater chamber between the outer wall of the inner passage and the inner wall of the outer passage, an end member having grooves for the ends of all of said cylinders and closing the said passages and chamber and the space within the innermost cylinder, conduits within said member connecting said inner and outer passages, closures for the upper end of said outer passage having a water inlet, a closure for the upper end of said inner passage and inner cylinders and having a water outlet delivering to the inner cylinder, and an electric heater in said heater chamber between said passages.

5. An electric water heater consisting of a cylindrical heater element, metal cylinders within and without said element constructed and arranged to conduct water in a circuitous path and in a stream of small cross section close to said heater within and without the same and out of contact therewith, a bottom member for said cylinders, top members for said cylinders, an axial rod for holding said bottom and top members together with said cylinders therebetween, a pressure controlled valve member above said top members, and an electric switch above said valve and controlled thereby.

In testimony whereof, I have signed the foregoing specification.

MICHEL S. GAZELLE.